United States Patent [19]

Kroenke et al.

[11] Patent Number: 4,816,303
[45] Date of Patent: Mar. 28, 1989

[54] PROCESS FOR INHIBITING CORROSION OF METAL AND CORROSION-INHIBITING LAYER USE THEREIN

[75] Inventors: William J. Kroenke, Brecksville; Anthony M. Mazany, Broadview Heights; John V. Standish, Cleveland, all of Ohio

[73] Assignee: The B. F. Goodrich Company, Akron, Ohio

[21] Appl. No.: 61,370

[22] Filed: Jun. 15, 1987

Related U.S. Application Data

[63] Continuation-in-part of Ser. No. 719,853, Apr. 4, 1985, abandoned.

[51] Int. Cl.$^4$ .................. B32B 15/04; C09K 15/18
[52] U.S. Cl. ................... 428/333; 106/14.15; 106/14.17; 106/14.44; 252/1; 252/8.514; 252/49.3; 252/49.7; 252/389.1; 252/389.54; 252/390; 422/7; 422/13; 422/16; 427/388.1; 427/435; 428/457; 524/838
[58] Field of Search ............... 106/14.15, 24.44, 14.17, 106/308 N; 210/698; 252/8.514, 49.3, 50, 180, 181, 389.1, 390, 389.54, 49.7, 1; 428/457, 469, 470, 474.4, 333; 422/7, 13, 16; 524/100, 838; 544/181, 4; 106/14.17

[56] References Cited

U.S. PATENT DOCUMENTS

| | | | |
|---|---|---|---|
| 3,346,527 | 10/1967 | Lagally | 210/698 |
| 3,974,323 | 8/1976 | Brouillette et al. | 428/457 |
| 4,129,540 | 12/1978 | Kroenke | 524/100 |
| 4,161,466 | 7/1979 | Kroenke | 524/100 |
| 4,217,216 | 8/1980 | Lipinski | 252/181 |
| 4,285,822 | 8/1981 | de Vries et al. | 252/46.4 |
| 4,414,122 | 11/1983 | West et al. | 252/49.7 |
| 4,647,388 | 3/1987 | Shrieiber | 252/49.3 |

FOREIGN PATENT DOCUMENTS

| | | |
|---|---|---|
| 620415 | 5/1961 | Canada . |
| 1588737 | 3/1970 | France . |
| 000241 | 1/1976 | Japan . |
| 171576 | 10/1983 | Japan . |
| 548571 | 3/1977 | U.S.S.R. . |
| 712395 | 1/1980 | U.S.S.R. . |

OTHER PUBLICATIONS

Stranick, M. A., "The Corrosion Inhibition of Metals by Molybdate-Part I. Mild Steal", National Ass'n of Corr. Eng., vol. 40, No. 6, Jun. 1984, 296.

*Primary Examiner*—Prince E. Willis
*Attorney, Agent, or Firm*—Alfred D. Lobo; James R. Lindsay

[57] ABSTRACT

Corrosion of ferrous metal and aluminum surfaces, in particular, is inhibited by a layer of an organic-metallic complex of a polyamine with a (i) metal oxide, or (ii) metallate ion, or (iii) water-soluble metallate salt, in aqueous systems having a pH greater than about 7. The polyamine contains at least four (4) amine groups, two of which are secondary amine groups. The effect of the N atoms stretched over the length of the polyamine produces a "caging effect"0 which immobilizes the oxide, or metallate ions, thus forming the protective layer. The organic-metallic complex deposited on the metal's surface forms the "amine-metallic" layer which may be either an "amine-metal oxide complex" which is a coordination complex, or, an "amine-metallate complex". The amine-metallate complex may be either an ionic complex of "amine.metallate ions", or, a mixture of the polyamine and metallate salt which mixture is not a complex, but in solution, behaves like one, and is therefore referred to as an admixture complex of an "amine+metallate salt". The organic-metallic complex may be present in a concentration from about 10 ppm to about 5% by wt in neutral or basic aqueous solution. In the lower range of this conc. up to about 2000 ppm, the complex is useful in aqueous process streams; in the higher range, from 2000 ppm to 5%, for a rinse for phosphated metal parts, in lieu of a conventional chromate rinse.

27 Claims, No Drawings

PROCESS FOR INHIBITING CORROSION OF METAL AND CORROSION-INHIBITING LAYER USE THEREIN

This is a continuation-in-part application of Ser. No. 719,853, filed Apr. 4, 1985 and now abandoned.

BACKGROUND OF THE INVENTION

This invention relates to a layer of a organic-metallic complex of a polyamine with a metal oxide, or metallate ion, or water-soluble metallate salt for reducing the rate of corrosion of metal surfaces in aqueous systems having a pH greater than about 7. Such a layer is formed on the surfaces of steel, iron and aluminum subject to corrosion by process water recirculated through cooling towers, cooling water for internal combustion engines which water is recirculated through heat exchange means, water in industrial boilers for the production of process steam, and comparable aqueous systems. This layer is also formed on ferrous and aluminum surfaces, and surfaces of alloys thereof, when the complex is in an aqueous synthetic metal-working fluid, or, in a water-based adhesive used on a metal surface, or, in an aqueous oi-field drilling mud in contact with steel drilling equipment, or, in an aqueous rinse for a bare, that is, untreated steel surface, or a treated, for example phosphated steel surface.

This invention more specifically relates to an amine-metallic layer formed in weakly acidic, neutral or alkaline aqueous systems by the chemical combination of a substantially linear polyamine, or a branched polyamine, either of which necessarily contains at least four (4) amine groups, two of which are secondary amine groups, with an oxide or metallate ion of molybdenum (Mo) or tungsten (W), so that when the primary amine group is anchored directly to the metal surface, the effect of the N atoms stretched over the length of the polyamine produces a "caging effect" which immobilizes the oxide or metallate ions thus forming the protective layer.

The corrosion inhibiting amine-metallic layer is thus a combination of a particular polyamine (referred to herein as "the polyamine component") and an oxide or metallate ionn of Mo or W (either of which is referred to herein as "the metal component"). The precise structure of the layer depends upon the pH of the aqueous system containing the components, inter alia. We have found that, as the pH increases above 7, the rate of formation of an amine metal oxide layer, which is a predominantly coordination complex of polyamine and metal oxide having the characteristics of a coordination increases. As the pH decreases, ion pair interaction between protonated amine and metallate anions predominates, and such ion pair interaction decreases as the pH increases, resulting in the amine-metallate complex having the characteristics of an ionic complex. The term "amine-metallate complex" is used herein to connote a solid ionic complex, or an admixture which, in solution, behaves like the ionic complex.

The term "polyamine" is used herein to specify an essentially linear oligomer free from tertiary amine groups, for example derived from ethylene diamine (EDA) or ethyleneimine (EI) monomer; and, also to specify branched oligomers and polymers containing tertiary amine groups, commercially derived by oligomerization or polymerization of EI. The term "oligomer" is used when the polyamine formed has relatively few repeating units, generally less than 10.

The prior art is replete with a wide array of additives for use in aqueous systems where corrosion of metal equipment and scale formation is a problem. These additives, for the purpose of inhibiting corrosion of metal surfaces and suppressing scale formation thereon, include inorganic salts, such as the chromate, phosphate, nitrite and molybdate salts, organic compounds such as various acyclic alkylamines, cycloalkylamines, heterocyclic amines, etc., but the use of organic-metallic complexes or coordination complexes such as zinc tannin, is relatively rare. Recently chromate salts have fallen into disfavor and have been replaced with sodium molybdate due mainly to the toxicity of the chromates, the level of which is regulated by Federal legislation. Hence, the emphasis on organic compounds such as the acrylic polymers, fatty acid sulfonates, and 1-hydroxyethylidene-1,1-diphosphonic acid (HEDP).

It is well known that the molecular structure of organic molecules influences the adsorbability, and correspondingly, the effectiveness of corrosion inhibitors. The general aspects of this topic are set forth in several texts, for example *Corrosion Control By Coatings*, edited by H. Leidheiser, Jr. (Science Press, Princeton, 1979). Despite proposed quantitative relationships between inhibitor effectiveness and specific characteristics attributable to the inhibitor, for example the Hammet constant which is a measure of a group's ability to modify electron configuration, or, to other characteristics such as the ability to change the spatial configuration of the groups, we know of no way to predict the efficacy of a proposed inhibitor with substantial quantitative accuracy.

An immobilized EDA group, attached through silicon attachment points, to a silica gel substrate, or to silylated controlled pore glass (CPG) beads, retained molybdate or tungstate which is monomeric (see "Structural Studies of Immobilied Ethylenediamine as a Preconcentrating Agent for Molybdate and Tungstate" by Leyden, D. E., et al, *Analytica Chemica Acta*, 100 (1978) 545–554), but when a precipitate was formed in EDA, the precipitate contained polymeric molybdate species. Study of this phenomenon was extended to alkylaminosilanes and aminosilanecarboxylates immobilzed on a silica substrate. But alkylaminosilanes and aminosilanecarboxylates, whether diamines or triamines, form complexes which in general are easily hydrolyzed and are unsuitable for use as corrosion inhibitors, as are complexes of amines which are not organic polyamines.

By "organic polyamines" we refer to amines which do not have a silicon, phosphorus, boron or other metal or metal-like elemental component. In particular, amines in which the Si is replaced with P or B are also unsuitable as corrosion inhibitors. Such unsuitability may be attributable to the aforementioned amines in these prior art complexes being doubly protonated in acidic solutions, indicating that an ion pair is formed, giving these complexes the characteristics of ionic compounds.

Moreover, the determination by Leydon et al that the stability of the adsorption bonding to the metal determines the fixation effectiveness, was observed only in an acid aqueous system and only where the amine was attached to a silica gel or CPG bead through a silicon attachment point. Most significant is that the EDA and triethylenetetramine (TETA), modified with silane groups to present Si attachment points, were "too short" chain length), so termed because they had too few amine groups to produce a caging effect sufficient to hold and immobilize the molybdate ion, though the carbon spacing (number of carbon atoms between amine N atoms) was satisfactory.

The failure to recognize the criticality of having at least 4 amine groups in a polyamine chain to provide excellent immobilization of molybdate ions apparently stemmed from an earlier study which showed that the effectiveness of Dow Corning Z-6020 (which has only two primary amine functional groups) for the extraction of $MoO_4^=$ (molybdate ion) dropped quickly as the pH rose from 3 to about 7; and, the extraction of $WO_4^=$ (tungstate ion) dropped even more quickly as the pH rose from about 5 until there was no extraction of tungstate ion at about pH 10 (see "Preconcentration of Certain Anions Using Reagents Immobilized via Silylation" by Leyden, D. E. et al, *Anal. Chem.* 48, No. 1, 67–70, Jan 1976). Though the formation of an immobilized layer of silylated amine was established by ESCA techniques, it is clear that the extraction of $MoO_4^=$ and $WO_4^=$ with the too-short silylated amines was specifically contraindicated in neutral or alkaline aqueous systems.

Among the organic polyamines, it is known that polymeric amines having only a very few repeating units in a polymer chain are more efficient corrosion inhibitors in acidic aqueous solutions than the corresponding monomers because of multiple absorption bonding. For example, poly(ethyleneamine) formed from EDA monomer, in particular, tetraethylenepentamine (TEPA) and TETA gave higher percentage inhibition than EDA, as did hexamethylenediamine (HMDA) which is not a polyamine but a diamine. (See "Inhibition of Acid Corrosion by Soluble Monomer and Polymer Amines Containing Identical Functional Groups" by Annand, R. R. et al., *Jour. Electrochem. Soc.*, Feb. 1965, 144–148). However, under neutral or alkaline conditions we found the polyamine by themselves to be much less effective. Under the particular acidic conditions of Annand et al $WO_3$ does not go into solution, and $MoO_3$ forms oxyhalides.

By a "polyamine" which is effective in our invention, we specifically refer to an amine having an amine functionality of at least four (4), that is, having at least 4 amine groups, at least one of which is primary, the remaining being either secondary or tertiary. The complexes which form the layer in neutral or alkaline aqueous systems undergo a change from a fluent condition to a non-fluent or immobilized layer on a steel, aluminum or other metal surface to form a complex which may be formed as (i) a coordination complex which has the characteristics of a coordination compound, or (ii) an interaction of ion pairs having the characteristics of an ionic complex, or (iii) an admixture of water-soluble metallate salts and the polyamine, which admixture, for the purposes of this invention, will be referred to as a complex, or 'admixture complex', because the admixture behaves as a complex does. The complex and the layer formed by it, have distinctly different and unexpectedly more favorable characteristics of corrosion inhibition than either a polyamine by itself, or the metal component by itself, because neither the polyamine nor the metal component by itself forms the necessary layer of organic-metallic complex.

In the prior art, amine molybdates have been precipitated from an aqueous solution of an amine and $MoO_3$, molybdic acid or a molybdenum salt. To ensure precipitation of the desired solid amine molybdate, when a molybdenum salt was used, the reaction was carried out in the presence of a suitable acid. The amount of each component used was stoichiometric, or with an excess of Mo compound, so that the solid, a useful fire retardant, would precipitate from solution (see U.S. Pat. No. 4,161,466 to Kroenke, W. J.). The solid obtained was identified as an ionic complex, leaving an acidic solution (having a pH less than 6) of the byproduct salt of the acid used. An analogous reaction between an amine and $MoO_3$ was carried out in the presence of a supporting electrolyte, for example ammonium chloride, in U.S. Pat. No. 4,217,292 to Kroenke, W. J. Again the reaction produced a solid ionic complex, leaving an acidic solution of the supporting electrolyte, in this case, ammonium chloride.

In the case of an amine, a Mo salt and an acid, there is nothing to indicate that a coordination complex, or an ionic complex, or an admixture complex might form as a stable solution. Similarly, in the case of an amine and $MoO_3$ there is nothing to indicate that a coordination complex, or an ionic complex might form as a stable solution. In either case, there is especially no reason to expect that any complex would form as a stable solution under neutral or basic conditions, in a contraction less than about 5% by wt.

SUMMARY OF THE INVENTION

It has been discovered that a corrosion inhibiting and scale suppressing layer is formed on a metal surface which layer is derived from a fluent neutral or alkaline aqueous solution of a polyamine component combined with a metal component of molybdenum or tungsten.

More specifically it has been discovered that the afoementioned polyamine component is provided by either (i) an essentially linear polyamine having a terminal primary amine group and intermediate secondary amine groups, or (ii) a branched polyamine having a terminal primary amine group and intermediate secondary amine groups, on the condition that, whether linear or branched, each polyamine contain at least four (4) amine groups.

It also has been specifically discovered that when the polyamine component satisfies the foregoing condition, the aforementioned metal component is provided by either (i) an oxide of an element selected from Mo and W, or, (ii) a metallate ion selected from molybdate and tungstate ions, or (iii) a substantially water-soluble salt selected from molybdates and tungstates of a cation selected from the group consisting of a complex amine, ammonium, phosphonium, sulfonium and sulfoxonium any of which may be substituted with one or more organic groups, and molybdates and tungstates of an element selected from Groups IA, IIA and IIB of the Periodic Table. Typcally, such complex amine is selected from piperazine, imidazole, pyridine, benzotriazole and the like; and, such organic groups include alkyl having from 1 to about 20 carbon atoms, cycloalkyl having from 4 to about 8 ring carbon atoms, aryl or aralkyl having from 7 to about 20 carbon atoms, piperazyl, imidazolyl, pyridinyl, benzotriazolyl and the like.

It is therefore a general object of this invention to provide a corrosion inhibiting and scale suppressing layer of a complex which is formed in an aqueous solution having a pH greater than about 7, by combining an essentially linear, and/or a branched polyamine with an oxide of Mo or W so as to form a coating of a predominantly amine-metal oxide complex characterized by its primary and secondary amine attachment points to the metal surface, which it is to protect.

It is also a general object of this invention to provide a corrosion inhibiting and scale suppressing layer of a complex which is formed in an aqueous solution having a pH greater than about 7, by combining an essentially linear, and/or a branched polyamine with a molybdate and/or tungstate anion so as to form a coating of a predominantly amine-metallate complex, said coating characterized by its primary and secondary amine attachment points to the metal surface, which it (the coating) is to protect.

It is another general object of this invention to provide a corrosion inhibiting and scale suppressing layer of a complex which is formed in an aqueous solution having a pH greater than about 7, by combining an essentially linear, and/or a branched polyamine with the water-soluble metallate salt defined hereinabove, as an admixture which behaves as a complex of its components.

Some specific objects of this invention are to provide a neutral or alkaline aqueous solution of the complex defined herein which, when added to the following provides excellent corrosion inhibition: (a) a cooling water system so as to contain an amount in the range from about 20 ppm to about 0.02% by wt of the complex; (b) an oil field drilling mud; (c) a water-based adhesive; (d) a metal working fluid; and (e) a rinse bath for chemically treating a bare, for example, sandblasted steel surface, or, an untreated freshly formed steel surface, or treated, for example, phosphated metal parts prior to being painted.

DETAILED DESCRIPTION OF PREFERRED EMBODIMENTS

The effectiveness of this invention is predicated upon the formation of an essentially continuous protective layer of an amine-metal oxide or amine-metallate complex on the surface of the metal to be protected. Any metal or metal alloy is protectable so long as the polyamine component of the layer is absorbed on the metal's surface without reacting with the metal. Cast iron, gray iron, steel and ferrous alloys, aluminum and aluminum alloys are corrodable metals which especially benefit from the process of this invention. Copper and copper alloys are not protected because the polyamine component reacts with copper.

The protective layer is formed from an aqueous composition which is neutral or alkaline having a pH greater than about 7, preferably in the range from about 7 to about 11, comprising a solution of polyethyleneimine (PEI) which is represented by a structure selected from

and

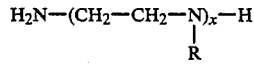

wherein,
R=

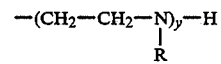

n represents an integer in the range from 2 to about 500;
x and y are integers, the sum (x+y) being in the range from 3 to about 2400;
and, the number of tertiary amine groups are randomly distributed among the secondary amine groups. Polyethylenimines of the foregoing structure are commercially available as Corcat® cationic polyamines from Cordova Chemical Company which had defined their structure given above.

The PEI provides the organic polyamine component of the layer to be formed. The structure of the PEI is not narrowly critical provided it has internal plural secondary amine groups spaced apart by two carbon atoms, the total number of the primary amine end groups and internal amine groups being at least 4. The PEI may be an essentially linear oligomer having from 4 to about 10 repeating amine units, or it may be a branched PEI having from 4 to about 500 repeating amine units. An even larger number of repeating units will provide a usable PEI but there is no justifiable economic benefit obtained from using such higher molecular weight polymers as far as the effectiveness of the corrosion inhibiting layer formed is concerned. Most preferred is TEPA.

In addition to the polyamine component, the other essential ingredient of the aqueous composition is the metal component which may be a water-soluble metallate (molybdate and tungstate) salt, or molybdenum oxide or tungsten oxide. The complex formed with the salt is the amine-metallate complex; the complex formed with the oxide is the amine-metal oxide complex. The layer formed by deposition of a film of the complex on the surface has essentially the same characteristics though its precise interatomic structure might vary depending upon how the complex is formed.

The amine-metallate complex may be formed as the ionic complex, identified herein as "amine.metallate ion", a specific example being TEPA. MoO$_4$; or, the amine-metallate complex may be formed as an admixture of polyamine and water-soluble metallate salt ("amine+metallate salt") which behaves like a complex, though the infrared spectrum of the solid admixture recovered from a solution thereof clearly indicates it (the recovered solid) is not a complex. In solution however, the polyamine and metallate ions are loosely associated to form a complex. Evidence of this phenonmenon, that is, the formation of the solid amine+metallate salt, a specific example being TEPA+Na$_2$MoO$_4$, at the surface of the ferrous or other metal parts in contact with the aquous system inhibited by the admixture, is provided by simply dipping the metal in the solution, and allowing the wetted metal to dry. A thin layer of the complex, visible to the naked eye, forms on the surface.

The "amine.metallate ion" and "amine+metallate salt", whichever is desired, is preferably formed by using an effective amount of metallate salt sufficient to form a corrosion inhibiting layer. This amount is related to the number of amine groups in the polyamine so that an effective amount of Mo or W atoms are caged by the amine groups. An effective number of Mo or W atoms is as low as 1 atom for 40 amine groups, and as high as 2 atoms for each amine group whether primary, secondary or tertiary. The preferred ratio of amine groups to metal Mo or W atoms is in the range from about 10:1 to about 1:1. An excess of Mo or W atoms over amine groups is not deleterious, but provides no economic benefit; too large an excess of amine groups over Mo or W atoms do not provide a "caging" function and serve only to denigrate the effectiveness of the corrosion inhibiting layer formed.

The amine-metallate complex, whether an amine.-metallate ion or an amine+metallate salt, may be formed from any Mo and/or W salts which are substantially soluble in neutral or alkaline water so that the desired metallate ions may be readily introduced into the aqueous system, but the ammonium and alkali metal salts, and alkaline earth metal salts are preferred. By "substantially soluble" we mean that the material dissolves in an amount at least 5 parts by weight per 100 parts of water. When the metallate ion is a molybdate ion, it may be $MoO_4^=$, $Mo_2O_7^=$ (dimolybdate), $Mo_5O_{17}H^{3-}$ (pentamolybdate), $Mo_7O_{24}^{6-}$ (heptamolybdate), $Mo_8O_{26}^{4-}$ (octamolybdate), and the like; and, when the metallate ion is tungstate ion, it may be $WO_4^=$, isopolytungstates such as $W_6O_{19}^=$, $W_{10}O_{32}^{4-}$, $H_2W_{12}O_{40}^{6-}$, and the like. Both $MoO_4^=$ and $WO_4^=$ also occur in basic aqueous solution.

The "amine.metallate ion" complex may be directly synthesized by reaction of the polyamine with the appropriate metallate salt, the preferred ratio of the reactants being such that the metallate salt is used in excess, on a weight basis, up to five (5) times as much being used, depending upon the molecular weight of the polyamine and the distribution of linear and branched chains in the polymer. Even chains with a substantial number of tertiary N atoms are effective in the formation of the amine.metallate ion complex on the surface of the corrodable metal.

Addition of the presynthesized amine.metallate ion complex to water results in the formation of ions in the water. A multiplicity of protonated polyamine chains attach themselves to the metal surface by adsorption of primary and/or secondary amine groups and complex with the metallate ions which are held between the polyamine chains forming an immobilized layer of amine-metallate complex. Such attachment to the metal surface or the metal surface oxide layer results from interaction therewith of the complex formed by combination of polyamine and the metal component; more specifically, by interaction between O atoms on the metal surface and the complex, more particularly a group thereof selected from a primary amine, a secondary amine, a metallate ion, a metallate salt and a metal oxide. A multiplicity of complex moieties, having the same or varying structures, with attachment points on the metal surface form the layer which is thus attached to the surface.

The amine.metallate ion may be formed in situ, by dissolving a preselected polyamine in an amount sufficient to furnish from about 5 ppm to about 5% by wt of polyamine, under conditions which protonate the amine, and adding sufficient metallate salt to furnish from about 5 ppm to about 5% by wt metallate ion in the water. The specific concentration of the polyamine and metallate ion used will vary depending upon the amount of oxygen dissolved in the water, the concentration and kind of dissolved salts, the hardness of the water, its temperature, and other considerations.

When an amine-metal oxide complex, identified herein as "amine.metal oxide", a specific example being $TEPA.MoO_3$, is the desirable form of the corrosion inhibitor, it may be formed, in situ, by dissolving molybdenum oxide or tungsten oxide in a preselected amount in a solution of the polyamine. The metal oxides are also only slightly soluble in neutral water, that is, in an amount less than 0.1 part by weight per 100 parts of water. It is essential that the polyamine be substantially soluble in water. Upon dissolving, the aqueous polyamine solution becomes basic in the pH range from about 7 to about 11, depending upon the polyamine used and the amount of it dissolved. The common W(VI) metal oxide is essentially insoluble in acidic solutions while the common Mo(VI) oxide decomposes. Therefore a neutral amine-metal oxide complex cannot be formed in acidic solutions.

The presence of the combination of polyamine and $MoO_3$ and/or $WO_3$ as a coordination complex in pH neutral solution is evidenced by the normally essentially insoluble $MoO_3$ and/or $WO_3$ being solubilized only if the polyamine is first dissolved; that is, the polyamine solubilizes the metal oxide. The fact that we have been able to dissolve more than 5 parts by wt of the oxides in water containing one of the preferred polyamines is direct evidence of complex formation, especially since we have recovered neutral complexes from these solutions. The amine-metal oxide complex is formed by covalent bonding of its components thus forming a coordination complex which has the characteristics of a coordination compound, as established by various analytical methods.

An excess of polyamine, that is, an amount greater than can be complexed, should be avoided, because free polyamine in solution tends to negate the beneficial corrosion inhibition of the amine-metal oxide complex in a manner analogous to such excess with an amine-metallate complex. The preferred polyamines of this invention are corrosive agents on ferrous metals when used by themselves, under the aqueous conditions specified. Both the amine-metal oxide complex and the amine-metallate complex, like the polyamine, are substantially soluble in water. However, the molybdate and tungstate salts are substantially soluble in water only as long as the pH is greater than about 7; at lower pH they precipitate insoluble, complex polymolybdates and polytungstates.

Although the conductivity of a polyamine-$MoO_3$ complex 0.1 molar in Mo is less than that of a $Na_2MoO_4$ solution, also 0.1 molar in Mo, the conductivity is still appreciable. The conductivity in the case of the complex results from the reaction of the polyamine-$MoO_2$ complex with water. This hydrolysis reaction results in a series of complicated equilibria and the formation of $HMoO_4^-$, $MoO_4^{2-}$, and protonated polyamine species all of which contribute to the observed conductivity.

The thin layer formed is generally less than 1000 Å (Angstroms) thick, and more typically from about 10 Å to about 100 Å thick. The layer is referred to as being formed from solid complex because of the presence of Mo and/or W on the surface of the metal being protected. X-ray photoelectron spectroscopy (XPS) shows that the Mor or W concentration on the surface, in the layer formed by exposure to metallate ions and/or salts, is much greater when a polyamine is present either as a preformed amine-metal oxide complex, or as an amine-metallate complex, than when the polyamine is absent. XPS also show that nitrogen is present in the layer which is evidence that the polyamine, either protonated or unprotonated, is also present.

In one preferred embodiment the protective layer of this invention is derived either from an inhibited cooling water system or boiler water system which has a pH greater than about 7, preferably in the range from about 7 to about 11. In this specific instance and pH range the amine-metal oxide complex is formed from polyethyleneimine (PEI) and a covalently bondable metal oxide selected from the oxides of molybdenum and tungsten which oxides are substantially soluble in an aqueous solution of polyamine. The PEI and metal oxide may be added separately to the cooling water system, but it is most preferred to preform a reaction product of the PEI and metal oxide, which reaction product is a complex having covalent bonds represented by "PEI.Metal Oxide".

Most preferred among the molybdenum oxides is $MoO_3$, and among the tungsten oxides, is $WO_3$.

Though emitter polyamines having the structure (I) or (II) will form a coordination complex with the foregoing oxides, most preferred are those having the structure (I), for example TEPA; most preferred among those having structure (II) are ones having a number average molecular weight $\overline{Mn}$ in the range from about 600 to about 200,000.

The foregoing polyamines are also most preferred when the complex to be formed is ionic, and the layer consists essentially of interacting ion pairs of protonated PEI and metallate, represented by "PEI.Metallate", and include "PEI.Molybdate", "PEI.Tungstate", or by the interaction of PEI and metallates such as $MoO_4^{2-}$ from $Na_2MoO_4$ mixed together in an aqueous system.

Preparation of an amine-metal oxide coordination complex:

A coordination complex of $MoO_3$ or $WO_3$ with a polyamine is prepared in aqueous solution using stoichiometric amounts, that is, about a 1:1 molar ratio of polyamine to metal oxide. Typically the concentration of complex desired in aqueous solutions, prepared for the purpose of testing corrosion inhibition of the complex on steel in especially prepared test water, was 500 ppm based on $MoO_4^=$. The reaction scale was chosen to provide 500 ml of solution corresponding to a Mo concentration equivalent to 25.00 g $MoO_4^=$ (22.50 g $MoO_3$). The reaction for making $TETA.MoO_3$ is as follows:

| Eq. wt. | 146.24 | 143.94 | 290.18 |
|---|---|---|---|
| | TETA + | $MoO_3$ ---→ | $TETA.MoO_3$ |
| | x | 22.5 g | y |
| | x = 22.86 g | | y = 45.36 g |

The Procedure:

1. 22.86 g of TETA is dissolved in about 166 ml of distilled water contained in a 500 mm 3-neck 24/40 round bottom flask fitted with a reflux condenser and a Teflon/glass mechanical stirrer.

2. The solution is heated close to its reflux temperature and 22.50 g of $MoO_3$ is added to the hot solution along with about 70 ml of additional distilled water.

3. The resulting grey-blue slurry while being heated to its reflux temperature quickly became a clear greenish yellow solution which became more yellow as the reflux condition was approached.

4. After refluxing for 30 min the yellow solution is allowed to cool to room temperature and filtered through a No. 50 filter paper, though there was no visible residue. The filtered solution is collected in a 500 ml volumetric flask and diluted to 500 ml. The final product was a clear yellow solution. Solid complex may be recovered by adding the prediluted water solution to a large volume of methanol. The exact structure of the complexes obtained vary depending upon the purity and the isomers of the polyamines which form them, but the structures are identifiable as being those of coordination compounds.

Preparation of amine-metallate solution:

Approximately equivalent amounts of PEI and $Na_2MoO_4$ are dissolved in water to provide the desired concentration of PEI and metallate ions. In an analogous manner, TEPA and pentaethylenehexamine (PEHA) solutions with $Na_2MoO_4$ are easily and quickly formed. Amine.metallate ionic complexes also can be formed by reacting solutions of PEI and metallate salts of the desired stoichiometry with just enough mineral acid to convert the metallate salt in situ to molybdic acid.

Complex Characterization:

All solid amine-metal oxide coordination complexes and all amine-metallate complexes which form the amine-metallic layer were characterized using infrared (IR) spectroscopy, or by elemental analysis, or both. IR spectroscopy from 200–1000 $cm^{-1}$ frequently identified the molybdate structure type(s). Mo was determined gravimetrically as $MoO_3$ by air ignition at 525° C. for 4 hr. Samples were also analyzed for C, H and N using a C—H—N analyzer.

Corrosion Testing Procedure:

Evaluation of the effectiveness of corrosion inhibition provided by the layer of a complex was done using a PARC Model 350-A automated corrosion measurement system. This is a fully automated, microprocessor controlled, electrochemical corrosion tester built around a PARC Model 173 potentiostat. The evaluations were made in the potentiodynamic scan mode. This setup provides a record of applied voltage versus measured current for the 1018 low carbon steel corrosion test sample which is used as the working electrode. Before each run, the test sample is immersed for 40 min in the test water (prepared as described hereunder). The corrosion scans were initiated in the cathodic region at a voltage which is about 0.250 volts more negative than the open circuit corrosion potential. The runs were terminated in the anodic region when (1) either general or pitting corrosion became pronounced, or (2) when the transpassive region of active corrosion was reached (for those systems which showed anodic passivation).

Test Water for Corrosion Tests:

A very aggressive high sulfate test water was prepared based on 0.05 molar $Na_2SO_4$. The other dissolved solids, minus all carbonates and bicarbonates, are at a level typically found in Ohio river water which had been concentrated five-fold in terms of its dissolved solids. This level of solids is only sometimes found in industrial cooling water towers, but is used herein because (i) it is extreme, and (ii) the high concentration of sulfate lends the requisite stability to the test water which provides for reproducible results.

The following Table I lists the components of the test water which was made up in 2 L (liter) batches.

TABLE I

| Test Water Recipe | |
|---|---|
| 1.7912 g | $CaSO_4.2H_2O$ |
| 0.3018 g | $MgSO_4.7H_2O$ |
| 0.5132 g | $MgCl.6H_2O$ |
| 0.0482 g | NaCl |

TABLE I-continued

| Test Water Recipe | |
|---|---|
| 0.01064 g | KCl |
| 0.1190 g | NaNO$_3$ |
| 14.2040 g | Na$_2$SO$_4$ |

A solution of the foregoing in Millipore water is diluted in 2000 ml.

Millipore water is so termed because it is produced by flowing distilled water through four Millipore cartridges, two of activated carbon and two with ion exchange resins. This filtration removes essentially all ions and organic matter from distilled water.

The pH of the test solution is adjusted to about 6.6–6.7, and the solution is stirred for 0.5 hr to see if there is any pH drift.

The test samples are coupons of 1018 mild carbon steel. Each sample is prepared as follows: (a) sanded with 240 grit silicon carbide (SiC) paper, (b) sanded with 600 grit SiC paper, and (c) degreased in boiling toluene or hexane for 0.5 hr.

In a typical industrial cooling water system, a high level of corrosion inhibitor is used initially to passivate the system, and when the desired passivation is achieved, the level of inhibitor is reduced to less than about 200 ppm, for cost reasons. The following tests were conducted at 500 ppm and 1000 ppm levels of corrosion inhibitor, based on the weight of MoO$_4$, partly in view of the foregoing general practice, and partly because the unusually high corrosivity of the test water dictated that relatively high levels of Na$_2$MoO$_4$ were required to get the low corrosion rates. Electrochemical corrosion testing of the high sulfate test water with and without various levels of Na$_2$MoO$_4$ is illustrated in the following Table II.

TABLE II

Corrosion Test Results With Control Samples

| Ex. No. | Additive | MoO$_4$= (ppm) | $E_{corr}$ (volts) | $I_{corr}$ (namp/cm$^2$) | Corr. Rate (mpy) |
|---|---|---|---|---|---|
| 1 | none (test water) | none | −0.544 | 54520 | 24.92 |
| 2 | sodium molybdate | 500 | −0.393 | 18660 | 3.19 |
| 3 | sodium molybdate | 1000 | −0.343 | 3583 | 1.64 |
| 4 | sodium molybdate | 1500 | −0.296 | 2240 | 1.02 |
| 5 | (NH$_4$)$_6$Mo$_7$O$_{24}$ | 1000 | −0.298 | 9296 | 4.29 |

In the following Table III are tabulated the results of tests with only PEI, only Na$_2$MoO$_4$, and the amine-metal oxide complex formed by combining them, the tests being conducted at two concentrations of additive. The PEI used is commercially available as Corcat P-18 having an average mol wt of 1800. The composition used was prepared to correspond to less than one-half of the amine groups being coordinated with MoO$_3$ for the formation of an octamolybdate complex. IR and elemental analysis indicated that a coordination complex was formed with about 40% of the amino groups which are calculated to be coordinated with MoO$_3$. The complex had a ratio of Mo/N=1/5 and contained 25.35% Mo. The complex is represented as PEI$_{5n}$(MoO$_3$)$_n$ corresponding to about [—(CH$_2$CH$_2$NH—)$_5$]$_n$(MoO$_3$)$_n$, though it will be recognized that the PEI is branched and contains approximately 30% primary, 40% secondary and 30% tertiary amine groups. Thus, only a minor proportion of the N atoms are coordinated, the number being estimated as 2/5 of the N atoms. The PEI.MoO$_3$ complex recovered is a light yellow glassy solid with an infrared spectrum different from that of PEI and MoO$_3$. After dehydration by vacuum drying, the solid complex is friable and highly soluble in water, that is, in an amount greater than about 20 parts by wt per 100 parts of water. In contrast, when a solution of Na$_2$MoO$_4$ and PEI with the same stoichiometry as the PEI.MoO$_3$ complex is dehydrated by vacuum drying, a white semi-solid is recovered. Its spectrum identifies it as an admixture of Na$_2$MoO$_4$ and PEI, represented herein as PEI+-Na$_2$MoO$_4$.

TABLE III

Corrosion Test Results with Complexes and Components Thereof

| Ex. No. | Additive | PEI (ppm) | MoO$_4$= (ppm) | $E_{corr}$ (volts) | $I_{corr}$ (namp/cm$^2$) | Corr. Rate (mpy) |
|---|---|---|---|---|---|---|
| 6 | PEI | 1000 | none | −0.651 | 105400 | 48.18 |
| 7 | PEI | 1000 | 500 | −0.428 | 4465 | 2.06 |
| 8 | PEI | 1000 | 1000 | −0.330 | 1197 | 0.55 |
| 9 | Na$_2$MoO$_4$ | none | 500 | −0.393 | 18660 | 8.53 |
| 10 | Na$_2$MoO$_4$ | none | 1000 | −0.343 | 3583 | 1.64 |
| 11 | PEI + Na$_2$MoO$_4$ | 1000 | 1000 | −0.276 | 964 | 0.44 |
| 12 | PEI | 500 | none | −0.640 | 71324 | 32.94 |
| 13 | PEI + Na$_2$MoO$_4$ | 500 | 500 | −0.346 | 2178 | 1.01 |

The amine-metallate corrosion inhibitor is formed with a wide variety of substantially soluble molybdate and tungstate salts. The effectiveness of corrosion inhibition depends upon the choice of metallate salt as much as it does upon the choice of polyamine. The evidence is that as long as the metallate salt is substantially soluble in the corrosive water used, the corrosion rate for the amine-metallate inhibitor is lower than that which might be expected as the sum of the contributions of each of the components of the inhibitor system. This is particularly surprising because the corrosion rate of the test water containing dissolved polyamines was found to be higher than the rate in the test water itself. Stated differently, the polyamines by themselves, in the range from about 10 ppm to about 5% by wt in the water, are more potent corrosive agents than the test water. The following Table IV is a tabulation of tests run with various molybdate salts in combination with TEPA which was present in an concentration of 500 ppm in each run. The corrosion rates (mil per year) are given for the salt only, water only with TEPA at 500 ppm, and for the combination of the salt (500 ppm) with TEPA (500 ppm).

TABLE IV

Corrosion Testing of TEPA-Molybdate Salt Complexes

| Ex. No. | Molybdate Salt | TEPA present | Corrosion Rate (mpy) |
|---|---|---|---|
| 14 | none (water only) | yes | 48.3 |
| 15 | Li$_2$MoO$_4$ | no | 2.59 |
| 16 | Li$_2$MoO$_4$ | yes | 1.61 |
| 17 | Na$_2$MoO$_4$ | no | 2.56 |
| 18 | Na$_2$MoO$_4$ | yes | 1.30 |
| 19 | K$_2$MoO$_4$ | no | 5.52 |

TABLE IV-continued
Corrosion Testing of TEPA-Molybdate Salt Complexes

| Ex. No. | Molybdate Salt | TEPA present | Corrosion Rate (mpy) |
|---|---|---|---|
| 20 | $K_2MoO_4$ | yes | 1.11 |
| 21 | $(NH_4)_2Mo_2O_7$ | no | 4.62 |
| 22 | $(NH_4)_2Mo_2O_7$ | yes | 3.41 |
| 23 | $(NH_4)_6Mo_7O_{24}$ | no | 3.76 |
| 24 | $(NH_4)_6Mo_7O_{24}$ | yes | 1.44 |
| 25 | $(NH_4)_4Mo_8O_{26}$ | no | 7.95 |
| 26 | $(NH_4)_4Mo_8O_{26}$ | yes | 0.698 |
| 27 | $MgMoO_4$ | no | 2.69 |
| 28 | $MgMoO_4$ | yes | 1.76 |

Comparable corrosion rates, that is, less than about 2 mpy, are obtained when TEPA or another polyamine having structures (I) or (II) are present in an effective amount in combination with molybdates and tungstates of a cation selected from the group consisting of a complex amine, ammonium, phosphonium, sulfonium and sulfoxonium any of which may be substituted with one or more organic groups, and molybdates and tungstates of an element selected from Groups IA, IIA and IIB of the Periodic Table. Typically, such complex amine is selected from piperazine, imidazole, pyridine, benzotriazole and the like; and, such organic groups include alkyl having from 1 to about 20 carbon atoms, cycloalkyl having from 4 to about 8 ring carbon atoms, aryl or aralkyl having from 7 to about 20 carbon atoms, piperazinyl, imidazolyl, pyridinyl, benzotriazolyl and the like.

It has been stated hereinabove that the choice of polyamine will affect the corrosion inhibition of a complex. The chain length of the polyamine is critical if the complex formed is to be a corrosion inhibitor, and such chain length is determined by the requirement that there be at least four (4) amine groups in a chain, and that there be two carbon atoms between successive amine groups. As will be seen from the data on corrosion rates presented in Table V herebelow, the corrosion rates with ethylene diamine (EDA) and diethylenetriamine (DETA) are about six times greater than those for effective polyamines. The rates for triethylenetetramine (TETA) appear to vary considerably indicating that an amine functionality of four (4 amine groups) is critical to obtain reproducibly the inhibition desired. Most preferred are polyamines having a functionality of at least 5.

Because of the ineffectiveness of EDA and DETA, they are not included among the amines referred to by the term 'polyamine'. In all the runs in Table V, an amine-metallate complex was formed with $Na_2MoO_4$ and the amount of complex used corresponded to 500 ppm of $MoO_4^=$. The weight ratio $Na_2MoO_4$/amine was 60/40 in all runs. A corrosion rate greater than about 4 mpy (mil per year) was deemed unacceptable as this level of inhibiton is obtained with the presence of 500 ppm $MoO_4^=$ alone, as for example when $Na_2MoO_4$ is used.

TABLE V
Effect of Amine Functionality

| Ex. No. | Amine + 500 ppm $MoO_4^=$ | $E_{corr}$ (volts) | $I_{corr}$ (namp/cm$^2$) | Corr. Rate (mpy) |
|---|---|---|---|---|
| 29 | ethylenediamine | −0.553 | 13774 | 6.36 |
| 30 | diethylenetriamine | −0.413 | 13858 | 6.40 |
| 31 | triethylenetetramine | −0.439 | 8090 | 3.74 |
| 32 | triethylenetetramine | −0.371 | 9718 | 4.49 |
| 33 | triethylenetetramine | −0.366 | 2910 | 1.06 |
| 34 | tetraethylenepentamine | −0.310 | 2137 | 1.08 |
| 35 | pentaethylenehexamine | −0.358 | 2345 | 1.08 |
| 36 | polyethylenenimine | −0.345 | 2178 | 1.01 |

The corrosion rate (mpy) in the foregoing tests are calculated from the corrosion current density, $I_{corr}$, which is calculated from the Tafel slopes obtained from the potentiodynamic scan in the vicinity of the cathodic to anodic transition. The experimental corrosion potential, $E_{corr}$ (or, $E_{corr}$ found), is the value of the potential when the potentiodynamic scan curve, potential versus log $I_{corr}$, makes the cathodic to anodic transition.

The initial value of the open circuit corrosion potential during the initial delay period before applying a potential and beginning the potentiodynamic scan is referred to as $E_{corr}°$ init; the value at the end of the initial delay period is referred to as $E_{corr}°$. It was observed that reproducibility of test results was affected by the length of the initial delay period. The variation in corrosion rate as a function of time, for PEI-$Na_2MoO_4$ inhibitor present in a ratio of $Na_2MoO_4$:PEI of 60/40, and in a concentration of 1000 ppm $MoO_4^=$, is tabulated in Table VI herebelow.

TABLE VI
Reproducibility of Corrosion Rate as a Function of Time

| Ex. No. | Time, age of solution (days) | $E_{corr}$ (volts) Initial | Start | Found | Corrosion Rate, (mpy) |
|---|---|---|---|---|---|
| 37 | 0 | −0.502 | −0.308 | −0.281 | 0.462 |
| 38 | 1 | −0.480 | −0.396 | −0.363 | 1.909 |
| 39 | 2 | −0.434 | −0.296 | −0.253 | 0.386 |
| 40 | 6 | −0.486 | −0.268 | −0.234 | 0.251 |
| 41 | 7 | −0.418 | −0.302 | −0.269 | 0.588 |
| 42 | 9 | −0.458 | −0.396 | −0.317 | 0.996 |

The variation seen in the foregoing table VI was deemed unacceptable, and was not the result of a systematic variation with aging. The samples had been prepared by polishing the milled test specimens with 240 and then 600 grit SiC paper, followed by degreasing with a refluxing toluene solution. By dint of trial and error, it was determined that the surface preparation of the test specimens was the nexus of the variations observed.

Accordingly, after the aforespecified polishing operations, the specimens were degreased in hexane instead of toluene. The degreasing step was followed by ultrasonic cleaning in the same Millipore water used to prepare the corrosion test water and inhibitor solutions. The effect of the change in preparation of the test specimens is evidenced in the results tabulated in Table VII herebelow.

The amine-metallate inhibitor used is TEPA.-$MoO_4^{2-}$ formed from a weight ratio of $Na_2MoO_4$:TEPA = 60/40, and used in a concentration of 1000 ppm $MoO_4^=$. As in Table VI, the open circuit corrosion potential $E_{corr}$ is measured at the beginning of the initial delay period, at the start of the run, and from the potentiodynamic scan. In all the runs in Table VII, ultrasonic cleaning was done with a Branson Sonifier Intensity System capable of supplying a mechanical output of 2200 in-lb/sec at the tip of its horn. The system consisted of a J-17V power supply, J-converter, and a ½" tapped cantenoidal horn. In the runs the system was operated at 50% of full power with the horn immersed in 60 ml of water containing the degreased specimen, and the cleaning time was 5 min.

TABLE VII

Effect of Hexane Degreasing and Ultrasonic Cleaning

| Ex. No. | Time, age of solution (days) | $E_{corr}$ (volts) Initial | Start | Found | Corrosion Rate, (mpy) |
|---|---|---|---|---|---|
| 43 | 28 | −0.294 | −0.302 | −0.298 | 0.183 |
| 44 | 29 | −0.344 | −0.262 | −0.253 | 0.257 |
| 45 | 30 | −0.288 | −0.328 | −0.263 | 0.233 |
| 46 | 31 | −0.250 | −0.274 | −0.289 | 0.251 |

Solutions of the complexes of this invention were evaluated in an open cooling water system in which the pH of the water was about 9. The tests were run at a relatively low concentration of $MoO_4^=$ of 66 ppm to get a relatively high corrosion rate with $Na_2MoO_4$ which was the standard against which a $PEI.MoO_3$ coordination complex and a $PEI+Na_2MoO_4$ admixture which behaves like a complex, are compared. The $PEI.MoO_3$ was prepared by dissolving 129 g (3.0 equivs) Corcat P-18 PEI in distilled water, then gradually adding 86 g $MoO_3$ (0.6 equivs) while stirring. The $PEI+Na_2MoO_4$ was prepared by dissolving 100 g (2.32 equivs) Corcat P-18 and 150 g (0.6 equivs) of $Na_2MoO_4$ in distilled water. A portion of each solution was added to the cooling water system until the system's water contained 66 ppm $MoO_4^=$. The concentration of $Na_2MoO_4.2H_2O$ in the standard was 100 mg/L which was equivalent to 66 ppm. In the following Table VIII are listed the corrosion rates with each inhibitor. It is evident that the rate with either the $PEI.MoO_3$ or the $PEI+Na_2MoO_4$ are several times better than the rate with the standard.

The water composition, given in mg/L of ions and salts, is as follows: 250 $Cl^-$, 520 $SO_4^=$, 25 $Ca^{++}$ (as $CaCO_3$), 15 $Mg^{++}$ (as $CaCO_3$), 170 $NaHCO_3$ and 25 $Na_2CO_3$. The temperature of the water to the cooling tower was 49° C., the ambient air was saturated with water, and the duration of the test was 48 hr.

Conventional cooling water systems, whether open or closed, particularly those used in industrial process streams, use about 200 ppm of $Na_2MoO_4$. Though a solution of the complex of this invention will provide excellent corrosion inhibition when added in such a concentration, the complex in any of its three forms, may be used at much higher concentration, up to about 2000 ppm in particular closed systems where the economics justify its use. In open cooling systems, as low as 10 ppm will have a noticeable effect over a period of time.

TABLE VIII

Corrosion Rates of Complexes compared with $Na_2MoO_4$

| Ex. No. | Additive | Conc. of additive (mg/L) | $pH_{init}$ | $pH_{final}$ | Corr. Rate (mpy) |
|---|---|---|---|---|---|
| 47 | $Na_2MoO_4$ | 100 | 8.9 | 9.2 | 98 |
| 48 | $PEI.MoO_3$ | 158 | 8.4 | 9.1 | 22 |
| 49 | $PEI + Na_2MoO_4$ | 186 | 9.4 | 9.2 | 15 |

Solutions of the complexes of this invention were evaluated in a closed cooling water system in which the pH of the water was about 9. The restricted oxygen content of 1 mg/L of water in this closed system compares with an oxygen content of about 5 mg/L if the water was saturated with air. The tests were run at a relatively high concentration of $MoO_4^=$ of 250 ppm to get a relatively low corrosion rate with $Na_2MoO_4$ which was the standard against which a $PEI.MoO_3$ coordination complex and a $PEI+Na_2MoO_4$ admixture which behaves like a complex, are compared. The $PEI.MoO_3$ and $PEI+Na_2MoO_4$ were prepared as described for the open cooling water test hereinabove. A portion of each solution was added to the cooling water system until the system's water contained 250 ppm $MoO_4^=$. The water composition is the same as that given for the open cooling water system. The concentration of $Na_2MoO_4.2H_2O$ in the standard was 500 mg/L which was equivalent to 250 ppm. The temperature of the water to the cooling tower was 65° C., and the duration of each test was 48 hr. In the following Table IX are listed the corrosion rates with each inhibitor. It is evident that the coordination complex performed better than either the admixture or the $Na_2MoO_4$ alone.

TABLE IX

Corrosion Rates of Complexes compared with $Na_2MoO_4$

| Ex. No. | Additive | Conc. of additive (mg/L) | $pH_{init}$ | $pH_{final}$ | Corr. Rate (mpy) |
|---|---|---|---|---|---|
| 50 | $Na_2MoO_4$ | 500 | 9.0 | 9.9 | 0.4 |
| 51 | $PEI.MoO_3$ | 785 | 9.0 | 8.5 | 0.0 |
| 52 | $PEI + Na_2MoO_4$ | 925 | 9.0 | 9.4 | 0.6 |
| 53 | $NaNO_2$ | 500 | 9.0 | 9.8 | 1.7 |

Aqueous Metalworking Lubricant Fluid:

The complexes of this invention may be used in an aqueous metalworking lubricant fluid which typically contains at least one, and generally two or more of the following components: anti-wear agent, anti-foaming agent, corrosion inhibitor, coupling agent, germicidial agent and the like which are well known in the prior art as described in U.S. Pat. No. 4,218,329 and the references cited therein, inter alia, the disclosures of which are incorporated by reference thereto as if fully set forth herein. A particular example is of a metalworking fluid comprising an alkanolamine, a fatty acid or salt thereof and sodium nitrite as the corrosion inhibitor.

The effectiveness of corrosion inhibition by solutions of complexes of this invention on cast iron chips was tested in accordance with the procedure set forth in an article titled "Sodium Molybdate Corrosion Inhibition of Synthetic Metalworking Fluids" by Vukasovich, M. S. in *Lub. Eng.* Vol 36, 12, 708–12 December 1980, the contents of which are incorporated by reference thereto as if fully set forth herein. Unalloyed gray cast iron chips are prepared by cutting an ingot with a dry shaper. The chips are screened to reject smaller than 10 mesh material, and the retained chips are washed with acetone. About 8 g of dry chips are placed in a 50 ml glass beaker and covered with 30 ml of the test fluid for 15 min. The fluid is then decanted and the wet chips are spread uniformly on filter paper on a glass plate which is placed in a closed cabinet maintained at a relative humidity of 80–90 percent at room temperature to retard drying. After 4 hrs the chips are discarded and the filter paper dried under ambient conditions. The extent of rust spotting on the filter paper is a measure of the fluid's corrosivity. A corrosivity rating of 1 (excellent) is given for no spotting, 3 (good) for slight spotting, 4 (fair) for substantial spotting, and 6 (bad) for gross rusting. The tests are performed in triplicate and the averaged results given hereinbelow in Table X.

The amount of additive is given in the Table as "wt % in concentrate"; the concentrate also contains (in wt %) 10% triethanolamine, 0.2% sodium salt of tolyltriazole, 0.4% Triton X-100 nonionic wetting agent, and 4.8% sodium lauryl sarcosinate. The concentrate is prepared with deionized water and diluted with water containing (in mg/L) 35 Cl$^-$, 50 SO$_4^=$, 50 Ca$^{++}$ (as CaCO$_3$), and 25 Mg$^{++}$ (as CaCO$_3$).

TABLE X

Corrosion Rates of Complexes in Synthetic Metalworking Fluid On Gray Cast Iron Chips

| Ex. No. | Additive | wt % in conc. | pH$_{init}$ | pH$_{final}$ | Corrosion Rating 1:20 dilution | 1:40 dilution |
|---|---|---|---|---|---|---|
| 54 | Na$_2$MoO$_4$ | 1.6 | 10.1 | 9.0 | 2 | 4 |
| 55 | PEI.MoO$_3$ | 2.5 | 9.0 | 8.5 | 2 | 3 |
| 56 | PEI + Na$_2$MoO$_4$ | 3.0 | 10.5 | 8.5 | 1 | 2 |

Oil Field Drilling Mud:

Drilling muds of the type used in oil fields typically contain a major proportion by wt of water, the remaining being a clay or talc containing corrosion inhibitors to minimize the corrosivity of the mud on the drilling equipment with which the mud comes into contact. A mud typically contains from about 5 to about 15% by wt of bentonite, Ca$^{++}$ and Cl$^-$ ions, and a corrosion inhibitor. The mud has a pH greater than about 7.

The results of tests with an oil field drilling mud in which the complexes of this invention were incorporated, are presented in Table XI hereinbelow. The complexes formed a corrosion inhibitor layer on C4130 steel drilling equipment which was in contact with the mud. The mud is commercially available containing Cor-Con M inhibitor from Drilling Mud, Inc. and contains NaNO$_2$ but no molybdates. This mud composition is as follows: 25 g bentonite, 350 mL H$_2$O containing 10,000 mg/L Cl$^-$ and 300 mg/L Ca$^{++}$. The approximate concentration of the inhibitor in the mud is 2 mg/L. The concentrations of the additives given in the Table are in addition to the Cor-Con M inhibitor in the mud. The sodium molybdate hydrate Na$_2$MoO$_4$.2H$_2$O was used and its concentration is given in the Table. The temperature at which the tests were conducted is 93° C., the duration of each test was 18 hr, and the cell pressure was 250 psig air (at room temp).

TABLE XI

Corrosion Rates of Complexes in Oil Field Drilling Mud On C4130 Steel Drilling Equipment

| Ex. No. | Additive | Conc. (mg/L) | pH$_{init}$ | pH$_{final}$ | Rate (mpy) |
|---|---|---|---|---|---|
| 57 | none (Cor-Con M only) | 2.0 | 8.6 | 9.6 | 207 |
| 58 | Na$_2$MoO$_4$ + Cor-Con M | 7.2 | 8.9 | 10.2 | 176 |
| 59 | PEI.MoO$_3$ + Cor-Con M | 11.3 | 8.4 | 8.4 | 234 |
| 60 | PEI + Na$_2$MoO$_4$ + Cor-Con M | 13.3 | 11.4 | 9.8 | 42 |

The corrosion inhibition of the coordination complex and the admixture complex of this invention, when used in a water-based adhesive applied to mild steel, was evaluated using ASTM test method D3310. In this test, a mild steel coupon is partially immersed in a water-based adhesive contained in an open jar placed within a larger jar containing water. After the larger jar is capped, the assembly is placed in an oven at 71° C. for one week.

The adhesive used in this test was Polyco 571 commercially available from Borden Chemical Co. The adhesive is a general purpose, medium viscosity, poly(vinylacetate) emulsion containing 55% solids, the remaining being water. The complexes may also be used in a wide variety of other water-soluble synthetic polymers used as adhesives for paper, fabric or synthetic or natural polymeric sheets, or labels or protective wrappings made therefrom, when any of the foregoing is to be adhered to steel or aluminum surfaces. Such adhesives include cellulose ether, hydroxyethylcellulose, polyacrylic salts, poly(vinyl methyl ether) and the like, having from 10 to about 90% by wt water content.

The corrosion ratings presented are obtained by observing the area of the corroded surface. The rating is 0.1x% of surface corroded. The data set forth in the following Table XII provides evidence that the complexes provided better inhibition than either Na$_2$MoO$_4$ or NaNO$_2$. Comparable results are obtained with the ionic complex. Further, each test of a complex combined with NaNO$_2$ showed better performance than the Na$_2$MoO$_4$-NaNO$_2$ combination.

TABLE XII

Corrosion Inhibition of Mild Steel by Water-Based Adhesive Containing Complexes and Prior Art Inhibitors- ASTM D3310 Test

| Ex. No. | Additive | Conc. in adhesive g/100 of Polyco | Corrosion Rating (mpy) |
|---|---|---|---|
| 61 | Na$_2$MoO$_4$ | 1.0 | 10 |
| 62 | PEI.MoO$_3$ | 1.6 | 5 |
| 63 | PEI + Na$_2$MoO$_4$ | 1.9 | 2 |
| 64 | Blank (no additive) | — | 10 |
| 65 | NaNO$_2$ | 1.0 | 6 |
| 66 | Na$_2$MoO$_4$ + NaNO$_2$ | 2.0 | 6 |
| 67 | PEI.MoO$_3$ + NaNO$_2$ | 2.6 | 5 |
| 68 | PEI + Na$_2$MoO$_4$ + NaNO$_2$ | 2.9 | 1 |

Each of the inhibitors, or combinations thereof tested in Table XII hereinabove, was then evaluated using a water-based adhesive test termed the Climax Drawdown Procedure. This test is based on drawing the adhesive compositions down to 2 mil dry films on mild steel sheet. Subsequently the films are dried for 4 hr at 52% relative humidity at room temperature. The test results in the following Table XIII corroborate the results of the ASTM test method D3310.

TABLE XIII

Corrosion Inhibition of Mild Steel by Water-Based Adhesive Containing Complexes and Prior Art Inhibitors-Climax Drawdown Procedure

| Ex. No. | Additive | Conc. in adhesive g/100 of Polyco | Corrosion Rating (mpy) |
|---|---|---|---|
| 69 | Na$_2$MoO$_4$ | 1.0 | 3 |
| 70 | PEI.MoO$_3$ | 1.6 | 3 |
| 71 | PEI + Na$_2$MoO$_4$ | 1.9 | 2 |
| 72 | Blank (no additive) | — | 3 |
| 73 | NaNO$_2$ | 1.0 | 2 |
| 74 | Na$_2$MoO$_4$ + NaNO$_2$ | 2.0 | 2 |
| 75 | PEI.MoO$_3$ + NaNO$_2$ | 2.6 | 1 |
| 76 | PEI + Na$_2$MoO$_4$ + NaNo$_2$ | 2.9 | 1 |

Phosphate Rinse Bath:

Most metals are chemically treated prior to painting. These treatments often involve phosphate treatments, followed by a $CrO_4^=$ containing rinse. Such treatments are widely in the coatings industry (see Leidheiser, H., supra).

The complexes of this invention are used as a replacement for the chromate rinse step. A relatively concentrated aqueous solution of the complex, in the range from about 0.1% to about 5% by wt of complex, and more preferably from about 0.5% to about 2% by wt in solution, is applied to the phosphated surface by any conventional means such as by spraying or dipping in a rinse bath. The temperature of the aqueous rinse solution is preferably in the range from about room temperature to about 80° C., more preferably from about 20° C. to about 50° C. Some organic coatings may be applied directly over the wet metal surface emerging from the rinse bath, while others are applied after the rinsed surface is dried. Deposition of a layer of the complex on the metal surface is particularly effective when epoxy coatings are applied over the dried rinsed surface.

Coupon Tests:

The following table XIV presents test results on mild steel coupons about 5 cm×5 cm square and 1 mm thick, which were immersed in solutions of the $PEI+Na_2MoO_4$ complex, and the $PEI+Na_2WO_4$ complex, both in the presence of, and in the absence of Cl. The presence of the Cl ion increases the weight loss of the coupon due to more severe corrosion than in the absence of Cl. The corrosion rate is time dependent. The complex is highly effective in the presence of 500 ppm Cl where $MoO_4$ or $WO_4$ are each present in 500 ppm (0.003 molar) concentration.

TABLE XIV

Corrosion of Steel Coupons in Presence of Cl

| Ex. No. | Additive in Solution | pH | 3 Day Exposure wt loss (g) | (mpy) | 5 Day Exposure wt loss (g) | (mpy) |
|---|---|---|---|---|---|---|
| 77 | $Na_2MoO_4$ | 9.5 | 0.0406 | 4.6 | 0.0919 | 10.8 |
| 78 | $PEI + Na_2MoO_4$ | 9.5 | 0.3322 | 3.7 | 0.0833 | 9.8 |
| 79 | $Na_2MoO_4 + Cl$ | 9.5 | 0.0480 | 5.5 | 0.105 | 12.3 |
| 80 | $PEI + Na_2MoO_4 + Cl$ | 9.5 | 0.0027 | 0.3 | 0.0067 | 0.8 |
| 81 | $Na_2WO_4 + Cl$ | 9.6 | 0.0991 | 11.3 | | |
| 82 | $TEPA + Na_2WO_4 + Cl$ | 9.6 | 0.0062 | 0.7 | | |

In a manner analogous to that described hereinabove for tests conducted with coupons of mild steel, more such coupons were subjected to corrosion tests in a solution containing low concentration of chloride ($2.4 \times 10^{-4}$ molar in $WO_4^=$ or $MoO_4^=$) at 70° C. The pH of the solution was about 7. The results are set forth hereinbelow in Table XV.

TABLE XV

Corrosion of Steel Coupons in Presence of Cl at 70° C.

| Ex. No. | Additive in Solution | $MoO_4$ or $WO_4$ ppm | Corrosion Rate mpy |
|---|---|---|---|
| 83 | $Na_2MoO_4.2H_2O$ | 100 | 33 |
| 84 | $TEPA + Na_2MoO_4$ | 100 | 22 |
| 85 | $TEPA.MoO_3$ | 100 | 11 |
| 86 | $Na_2WO_4.2H_2O$ | 133 | 46 |
| 87 | $TEPA + Na_2WO_4$ | 100 | 29 |
| 88 | TEPA | — | 80 |

In a manner analogous to that described hereinabove for tests conducted with coupons of mild steel, more such coupons were subjected to corrosion tests in a solution containing 100 ppm $MoO_4$ of coordination complexes of polyamines with $MoO_3$, at elevated temperature of 70° C. The conc. is given in terms or $MoO_4$ to be consistent. The results are presented in Table XVI hereinbelow.

TABLE XVI

Corrosion of Steel Coupons with Coordination Complexes

| Ex. No. | Coord. Complex in Solution | Corrosion Rate (mpy) |
|---|---|---|
| 89 | $DETA.MoO_3$ | 20 |
| 90 | $TETA.MoO_3$ | 16 |
| 91 | $TEPA.MoO_3$ | 11 |
| 92 | $PEHA.MoO_3$ | 9 |
| 93 | $PEI.MoO_3$ | 13 |

In a manner analogous to that described hereinabove for tests conducted with coupons of mild steel, more such coupons were subjected to corrosion tests in a relatively concentrated solution containing 2% by wt $MoO_4$ of a coordination complex of $TEPA.MoO_3$. The coupons were dipped in the solution, as if in a rinse bath, and then placed in a cabinet at 100 relative humidity and 50° C. Untreated freshly cleaned coupons having bare metal surfaces were also placed in the cabinet and all were examined after 16 hr. The average amount of the area corroded is presented in Table XVII hereinbelow.

TABLE XVII

Corrosion of Steel Coupons with 2% by wt Coordination Complex

| Ex. No. | Coordination Complex | % Area Corroded |
|---|---|---|
| 94 | $TEPA.MoO_3$ | 1 |
| 95 | None (untreated coupons) | 50 |

Comparable results are obtained with a 2% by wt solution of a $TEPA.MoO_4$ ionic complex, and a 2% by wt solution of an admixture complex of $TEPA+Na_2MoO_4$. In each case the protective layer described hereinbefore is formed. Protection of such a layer is particularly desirable on freshly hot or cold rolled mild steel sheet, extruded or otherwise formed channel and I-beams, or freshly sandblasted steel surfaces of structural members of bridges and the like which await painting. Conventionally such steel surfaces are protected by a film of petroleum-based oil conatining a corrosion inhibitor, but the oil film provides inadequate protection, particularly outdoors, and oily surfaces must be cleaned prior to being painted. The foregoing disadvantages are avoided with the protective layer of this invention.

Preparation of Ionic Complex in Solution:

A solution of the ionic complex $TEPA.MoO_4$ containing 0.05 g $MoO_4$/ml was prepared by dissolving 29.59 g TEPA in 166 ml of distilled water at room temperature and adding 37.82 g $Na_2MoO_4.2H_2O$ dissolved in 34 ml distilled water. The yellow-orange solution was heated to between 50° and 75° C. by agitating with a mechanical stirrer, and a solution of 16.14 g of 95% $H_2SO_4$ dissolved in 50 ml of distilled water was added as a slow continuous stream. During the addition of the H₂SO₄, the solution went through a dramatic change in appearance which provided visible evidence of the in situ formation of the ionic complex. The solution in consecutive steps changed from yellow-orange to dark orange, to dark gold, to dark green before reversing the color trend and becoming a stable red-orange solution. After the addition of 25 ml of distilled water, the solution was brought to reflux temperature and kept at reflux for 30 min with no change in appearance. After cooling to room temperature, the solution was diluted to 500 ml in a volumetric flask.

The solution containing the ionic complex was evaluated as a corrosion inhibitor for mild carbon steel using the standard electrochemical corrosion testing protocol and high sulfate test water described hereinabove. The ionic complex was very effective giving a reduced corrosion rate of 1.52 mpy at pH 6.6 with an equivalent $MoO_4^=$ conc of 500 ppm.

We claim:

1. A corrosion inhibiting and scale suppressing layer formed in a thickness sufficient to provide desired protection on a metal surface of a substrate in contact with an aqueous solution having a pH greater than about 7, said layer consisting essentially of a combination of an organic polyamine and a metal component, said organic polyamine being a polyethyleneimine present in an amount in the range from about 10 ppm to about 5% by weight, and having at least one terminal primary amine group and intermediate plural secondary amine groups, the total number of said primary and secondary amine groups being at least 4, said polyethyleneimine being selected from an essentially linear polyethyleneimine having from 4 to about 10 repeating units, and a branched polyethyleneimine having from 4 to about 500 repeating units, wherein each polyethyleneimine is represented by a structure selected from

and

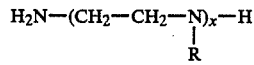

wherein,
R=

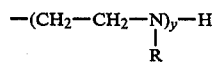

n represents an integer in the range from 2 to about 500;

x and y are integers, the sum (x+y) being in the range from 3 to about 2400;

and, the number of tertiary amine groups are randomly distributed among the secondary amine groups;

said metal component being present in an amount in the range from about 10 ppm to about 5% by weight and selected from the group consisting of (i) an oxide of an element selected from Mo and W, and (ii) a metallate ion selected from molybdate and tungstate ions;

whereby a complex of said polyamine and said metal component is formed to provide said layer which is attached to said surface by interaction therewith of a group selected from a primary amine, a secondary amine, a metallate ion and a metal oxide; and at least said primary amine group is anchored directly to said metal surface.

2. The layer of claim 1 wherein said thickness is in the range from about 10 Å to about 1000 Å.

3. The layer of claim 2 wherein said polyethyleneimine has internal plural secondary amine groups spaced apart by two carbon atoms, the total number of the primary amine end groups and internal amine groups being at least 4, and said polyamine is anchored directly to said metal surface.

4. The layer of claim 2 wherein said polyethyleneimine is selected from the group consisting of an essentially linear oligomer having from 4 to about 10 repeating units, and polyethyleneimine having a number average molecular weight $\overline{Mn}$ in the range from about 600 to about 200,000.

5. The layer of claim 2 consisting essentially of a deposit of said complex on said surface, said complex formed being selected from the group consisting of (i) a coordination complex of said polyethyleneimine and said oxide which coordination complex has the characteristics of a coordination compound, (ii) an interaction of ion pairs having the characteristics of an ionic complex which is formed with an ion of said polyamine and said metallate ion, and (iii) an admixture of said polyamine with a water-soluble metallate salt which generates said metallate ion.

6. The layer of claim 3 wherein said polyamine is selected from the group consisting of tetraethylenepentamine, pentaethylenehexamine, hexaethyleneheptamine, and a branched oligomer having from 4 to about 500 repeating units.

7. The layer of claim 5 wherein said water-soluble metallate salt is selected from molybdates and tungstates of a cation selected from the group consisting of a complex amine, ammonium, phosphonium, sulfonium and sulfoxonium any of which onium cations may be substituted with one or more organic groups, and molybdates and tungstates of an element selected from Groups IA, IIA and IIB of the Periodic Table.

8. The layer of claim 7 wherein said complex amine is selected from the group consisting of piperazine, imidazole, pyridine, and benzotriazole, and said one or more organic groups is selected from alkyl having from 1 to about 20 carbon atoms, cycloalkyl having from 4 to about 8 ring carbon atoms, aryl or aralkyl having from 7 to about 20 carbon atoms, piperazinyl, imidazolyl, pyridinyl, and benzotriazolyl.

9. An aqueous solution of a complex, said solution having a pH greater than about 7, said complex consisting essentially of an essentially linear or branched organic polyamine in combination with a metal component, said organic polyamine being present in an amount in the range from about 10 ppm to about 5% by weight, and having at least one terminal primary amine group and intermediate plural secondary amine groups, the total number of said primary and secondary amine groups being at least 4, said polyamine being selected from an essentially linear polyethyleneimine having from 4 to about 10 repeating units, and a branched polyethyleneimine having from 4 to about 500 repeating units, wherein each polyethyleneimine is represented by a structure selected from

and

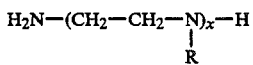

wherein,
R=

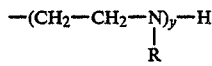

n represents an integer in the range from 2 to about 500;

x and y are integers, the sum (x+y) being in the range from 3 to about 2400;

and, the number of tertiary amine groups are randomly distributed among the secondary amine groups;

said metal component being present in an amount in the range from about 10 ppm to about 5% by weight and selected from the group consisting of (i) an oxide of an element selected from Mo and W, and (ii) a metallate ion selected from molybdate and tungstate ions.

10. The aqueous solution of claim 9 wherein said polyethyleneimine is selected from the group consisting of tetraethylenepentamine, pentaethylenehexamine, hexaethyleneheptamine, and polyethyleneimine having a number average molecular weight $\overline{Mn}$ in the range from about 600 to about 200,000.

11. The aqueous solution of claim 9 wherein said complex is selected from the group consisting of (i) a coordination complex of said polyethyleneimine and said oxide, (ii) an interaction of ion pairs of said polyamine and said metallate ion, and (iii) an admixture of said polyamine with a water-soluble metallate salt which generates said metallate ion.

12. The aqueus solution of claim 11 wherein said water-soluble metallate salt is selected from molybdates and tungstates of a cation selected from the group consisting of a complex amine, ammonium, phosphonium, sulfonium and sulfoxonium any of which onium cations may be substituted with one or more organic groups, and molybdates and tungstates of an element selected from Groups IA, IIA and IIB of Periodic Table.

13. The aqueous solution of claim 12 wherein said complex amine is selected from the group consisting of piperazine, imidazole, pyridine, and benzotriazole, and said one or more organic groups is selected from alkyl having from 1 to about 20 carbon atoms, cycloakyl having from 4 to about 8 ring carbon atoms, aryl or aralkyl having from 7 to about 20 carbon atoms, piperazinyl, imidazolyl, pyridinyl, and benzotriazolyl.

14. The aqueous solution of claim 11 wherein said complex is a coordination compound of said polyethyleneimine which is selected from the group consisting of tetraethylenepentamine, pentaethylenehexamine, hexaethyleneheptamine, and polyethyleneimine having a number average molecular weight $\overline{Mn}$ in the range from about 600 to about 200,000, and, an oxide of molybdenum or tungsten which oxide is essentially insoluble in water in the absence of said polyamine.

15. The aqueous solution of claim 11 wherein said complex is an ionic complex of an ion of said polyethyleneimine which is selected from the group consisting of tetraethylenepentamine, pentaethylenehexamine, hexaethyleneheptamine, and polyethyleneimine having a number average molecular weight $\overline{Mn}$ in the range from about 600 to about 200,000, and, an ion of said water-soluble metallate salt.

16. The aqueous solution of claim 11 wherein said complex consists essentially of loosely associated ions of said polyethyleneimine and said water-soluble metallate salt which ions are generated in said solution by an admixture of said polyethyleneimine and said water-soluble metallate salt.

17. In an aqueous metal working lubricant fluid having a pH greater than about 7 and containing at least one ingredient selected from the group consisting of an anti-wear agent, anti-foaming agent, corrosion inhibitor, coupling agent and germicidial agent, the improvement consisting essentially of a complex in solution, said complex consisting essentially of an essentially linear or branched organic polyamine in combination with a metal component, said organic polyamine being a polyethyleneimine present in an amount in the range from about 10 ppm to about 5% by weight, and having at least one terminal primary amine group and intermediate plural secondary amine groups, the total number of said primary and secondary amine groups being at least 4, said polyethyleneimine being selected from an essentially linear polyethyleneimine having from 4 to about 10 repeating units, and a branched polyethyleneimine having from 4 to about 500 repeating units, wherein each polyethyleneimine is represented by a structure selected from

and

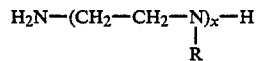

wherein,
R=

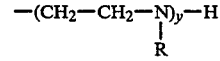

n represents an integer in the range from 2 to about 500;

x and y are integers, the sum (x+y) being in the range from 3 to about 2400;

and, the number of tertiary amine groups are randomly distributed among the secondary amine groups;

said metal component being present in an amount in the range from about 10 ppm to about 5% by weight and selected from the group consisting of (i) an oxide of an element selected from Mo and W, and (ii) a metallate ion selected from molybdate and tungstate ions.

18. In an aqueous drilling mud having a pH greater than about 7, the improvement consisting essentially of a complex in solution, said complex consisting essentially of an essentially linear or branched organic polyamine in combination with a metal component, said organic polyamine being polyethyleneimine present in an amount in the range from about 10 ppm to about 5% by weight, and having at least one terminal primary amine group and intermediate plural secondary amine groups, the total number of said primary and secondary amine groups being at least 4, said polyethyleneimine being selected from an essentially linear polyethyleneimine having from 4 to about 10 repeating units, and a branched polyethyleneimine having from 4 to about 500 repeating units, wherein each polyethyleneimine is represented by a structure selected from $$H_2N-CH_2-CH_2-(NH-CH_2-CH_2)_n-NH_2$$

and $$H_2N-(CH_2-CH_2-N)_x-H$$
$$|$$
$$R$$

wherein,
R =

$$-(CH_2-CH_2-N)_y-H$$
$$|$$
$$R$$

n represents an integer in the range from 2 to about 500;

x and y are integers, the sum (x+y) being in the range from 3 to about 2400;

and, the number of tertiary amine groups are randomly distributed among the secondary amine groups;

said metal component being present in an amount in the range from about 10 ppm to about 5% by weight and selected from the group consisting of (i) an oxide of an element selected from Mo and W, and (ii) a metallate ion selected from molybdate and tungstate ions.

19. In a water-based adhesive having a water content in the range from about 10% to about 90% by wt the remaining being a polymer or salt thereof, and having a pH greater than about 7, the improvement consisting essentially of a complex in solution, said complex consisting essentially of an essentially linear or branched organic polyamine in combination with a metal component, said organic polyamine being a polyethyleneimine present in an amount in the range from about 10 ppm to about 5% by weight, and having at least one terminal primary amine group and intermediate plural secondary aminegroups, the total number of said primary and secondary aminegroups being at least 4, said polyethyleneimine being selected from an essentially linear polyethyleneimine having from 4 to about 10 repeating units, and a branched polyethyleneimine having from 4 to about 500 repeating units, wherein each polyethyleneimine is represented by a structure selected from $$H_2N-CH_2-CH_2-(NH-CH_2-CH_2)_n-NH_2$$

and

-continued $$H_2N-(CH_2-CH_2-N)_x-H$$
$$|$$
$$R$$

wherein,
R =

$$-(CH_2-CH_2-N)_y-H$$
$$|$$
$$R$$

n represents an integer in the range from 2 to about 500;

x and y are integers, the sum (x+y) being in the range from 3 to about 2400;

and, the number of tertiary amine groups are randomly distributed among the secondary amine groups;

said metal component being present in an amount in the range from about 10 ppm to about 5% by weight and selected from the group consisting of (i) an oxide of an element selected from Mo and W, and (ii) a metallate ion selected from molybdate and tungstate ions.

20. A method for inhibiting corrosion on a metal surface in a cooling water system, comprising, adding to said water a solution of a complex so as to introduce from 10 ppm to about 2000 ppm by wt of said complex into said water which has a pH in the range from about 7 to about 11, said complex consisting essentially of an essentially linear or branched organic polyamine in combination with a metal component, said organic polyamine being a polyethyleneimine present in an amount in the range from about 10 ppm to about 5% by weight, and having at least one terminal primary amine group and intermediate plural secondary amine groups, the total number of said primary and secondary amine groups being at least 4, said polyethyleneimine being selected from an essentially linear polyethyleneimine having from 4 to about 10 repeating units, and a branched polyethyleneimine having from 4 to about 500 repeating units, wherein each polyethyleneimine is represented by a structure selected from $$H_2N-CH_2-CH_2-(NH-CH_2-CH_2)_n-NH_2$$

and $$H_2N-(CH_2-CH_2-N)_x-H$$
$$|$$
$$R$$

wherein,
R =

$$-(CH_2-CH_2-N)_y-H$$
$$|$$
$$R$$

n represents an integer in the range from 2 to about 500;

x and y are integers, the sum (x+y) being in the range from 3 to about 2400;

and, the number of tertiary amine groups are randomly distributed among the secondary amine groups;

said metal component being present in an amount in the range from about 10 ppm to about 5% by weight and selected from the group consisting of (i) an oxide of an element selected from Mo and W, and (ii) a metallate ion selected from molybdate and tungstate ions.

21. The method of claim 20 including depositing said complex as a layer having a thickness in the range from about 10 Å to about 1000 Å.

22. The method of claim 21 wherein said polyamine has internal plural secondary amine groups spaced apart by two carbon atoms, the total number of the primary amine end groups and internal amine groups being at least 4, and said polyamine is anchored directly to said metal surface.

23. The method of claim 21 wherein said polyamine is selected from the group consisting of an essentially linear oligomer having from 4 to about 10 repeating units, and polyethyleneimine having a number average molecular weight $\overline{Mn}$ in the range from about 600 to about 200,000.

24. The method of claim 21 wherein said layer consists essentially of a deposit of said complex on said surface, said complex formed being selected from the group consisting of (i) a coordination complex of said polyamine and said oxide which coordination complex has the characteristics of a coordination compound, (ii) an interaction of ion pairs having the characteristics of an ionic complex which is formed with an ion of said polyamine and said metallate ion, and (iii) an admixture of said polyamine with a water-soluble metallate salt which generates said metallate ion.

25. The method of claim 22 wherein said polyamine is selected from the group consisting essentially of tetraethylenepentamine, pentaethylenehexamine, hexaethyleneheptamine and a branched oligomer having from 4 to about 500 repeating units.

26. The method of claim 24 wherein said water-soluble metallate salt is selected from molybdates and tungstates of a cation selected from the group consisting of a complex amine, ammonium, phosphonium, sulfonium and sulfoxonium any of which onium cations may be substituted with one or more organic groups, and molybdates and tungstates of an element selected from Groups IA, IIA and IIB of the Periodic Table.

27. The method of claim 26 wherein said complex amine is selected from the group consisting of piperazine, imidazole, pyridine, and benzotriazole, and said one or more organic groups is selected from alkyl having from 1 to about 20 carbon atoms, cycloalkyl having from 4 to about 8 ring carbon atoms, aryl or aralkyl having from 7 to about 20 carbon atoms, piperazinyl, imidazolyl, pyridinyl, and benzotriazolyl.

* * * * *